Patented June 19, 1951

2,557,094

UNITED STATES PATENT OFFICE 2,557,094

ISOBUTYLENE-p-CHLORO-STYRENE-STYRENE TRIPOLYMER

John D. Garber, Cranford, N. J., assignor to Standard Oil Development Company, a corporation of Delaware No Drawing. Application September 29, 1945, Serial No. 619,417

2 Claims. (Cl. 260—80.5)

This invention relates to low temperature catalytic polymerization of halogenated styrene monomers for the production of valuable modified styrene resins.

Polystyrenes or styrene resins are well known high polymers of styrene. They have been formed generally by heating monomeric styrene with a peroxide catalyst 8 to 14 hours at about 130° C. They are hydrocarbon thermoplastics with a number of desirable qualities, such as good dimensional stability, insulating properties, transparency, and resistance to many chemicals. On account of their deficiencies in certain other respects, such as low heat resistance and flammability, attempts have been made to form modified styrene resins, particularly with halogenated aromatic hydrocarbons.

An object of this invention is to provide a process for preparing modified styrene resins having good qualities of polystyrene with improvements in certain characteristics for more versatile application.

A more specific object is to provide an accommodative process for rapid polymerization of halogenated styrene, like chlorostyrene monomers, alone, or with styrene or other styrene derivatives, to produce the desirable modified or halogenated styrene resins, the process being adapted for continuous operation, for variations in the compositions of the resins, and for easy control.

Attainment of the objects stated and other objects will be understood from the following description.

Objects of this invention are accomplished by utilizing a technique in which the polymerization is conducted at very low temperatures, below 0° C., and preferably in the range —20° C. to —165° C., with a Friedel-Crafts type catalyst. Such polymerization conditions have been applicable in polymerizing certain unsaturated hydrocarbons, especially monomers like isobutylene, butadienes, and hydrocarbons containing vinyl radicals, but have been ineffective with respect to many other types of compounds, particularly compounds having electronegative polar substituents. Now, it is determined that with low temperature catalytic conditions styrene derivatives containing an electronegative polar substituent, particularly halogenated styrene derivatives, will additively polymerize or copolymerize with styrene and other kinds of styrene derivatives to form the modified styrene resins desired.

The halogenated styrene derivatives best suited as reactants in the low temperature polymerization for producing the desirable modified styrene resins are nuclear halogen-substituted styrene derivatives, e. g., para chlorostyrene, dichlorostyrene, and corresponding bromostyrenes. In general, the nuclear halogen-substituted styrene polymerizes more readily than styrene. The activating effect does not definitely depend on the position of the halogen in the nucleus. More than one halogen substituent may be present in the nucleus, and also one may be present in the side chain. Bromine tends to have a greater activating effect than chlorine, and accordingly the activating effect increases with iodine but decreases with fluorine. Halogen substitution in the side chain has an inhibiting effect and most definitely so in the beta position.

Halogenated styrene monomers, as indicated, are capable of being polymerized at low temperatures individually or in combinations. Also, they may be copolymerized or interpolymerized at low temperatures with styrene, styrene homologs, or similar compounds containing an ethenyl attached to an aromatic nucleus.

Although general conditions of the low temperature polymerization have been stated, of course, each different kind of reactant responds best to certain conditions, depending on the reactivity of the monomers, the solubilities of the monomers and polymers, the yields and kind of products desired.

A preferred catalyst for the polymerization is aluminum chloride ($AlCl_3$), but other Friedel-Crafts type catalysts may be used. A number of the other Friedel-Crafts type catalysts are listed in "Chemical Reviews," pp. 327–375, vol. 17, No. 3 (1935) by N. O. Calloway.

The monomeric reactants are to be treated preferably in an organic diluent that remains liquid at the polymerization temperature and in which the catalyst remains active. Low boiling alkyl halides, e. g. methyl chloride and ethyl chloride, and methylene chloride, are suitable as diluents and as solvents for the catalyst. Low boiling hydrocarbons, e. g., propane, ethane, and ethylene, may be used to some extent. The Friedel-Crafts catalyst gaseous $BF_3$ may be used as such, undissolved in a solvent.

A solution of the catalyst is preferably admixed with a solution of the reactant to form the reaction mixture. Aluminum chloride is thus preferably first dissolved in a suitable solvent, such as one of the alkyl halides, in a weight concentration in the range of about 0.1 to 2%, and this solution is admixed with the reactant solution. The concentrations of the other Friedel-Crafts catalysts may vary.

In the preferred mode of procedure a solution is formed of reactant in solvent in a volume ratio ranging from about 1:1 to 1:10; this solution is cooled to the low polymerization temperature; and the catalyst solution similarly cooled is admixed while maintaining the resulting reaction mixture at the polymerization temperature. The cooling may be effected with an external refrigerant or an internal refrigerant that does not interfere with the reaction, e. g., solid carbon dioxide at −78° C. When the reaction is completed or is to be stopped, a substance which deactivates or hydrolyzes the catalyst is added to the cold reaction mixture. This deactivating substance, in general, is a polar compound, e. g., water, an alkaline solution, an alcohol, ketone, or the like. On addition of sufficient amounts of such polar compounds immiscible with a polymer product dissolved in the reaction mixture, the polymer product is precipitated. The polymer product may then be separated, washed, dried, or further processed.

For illustration, more details on the process and results of several preferred embodiments are given in the following examples:

Example I

A solution of 50 g. of p-chlorostyrene in 250 cc. of MeCl (methyl chloride) was cooled to −100° C. in an ethylene jacketed reactor. A solution of AlCl$_3$ in MeCl (0.50 g./100 cc.) was added dropwise to the well agitated solution. A reaction occurred to yield a red solution which contained most of the polymer in solution and some polymer particles that were insoluble in the reaction mixture.

The product was recovered by quenching in three volumes of i-C$_3$H$_7$OH in order to deactivate the residual catalyst and extract unreacted monomer. After drying on a rubber mill there resulted a hard, extremely tough resin which was soluble in benzene and methyl ethyl ketone, softened in 54 naphtha and was insoluble in petroleum ether. The softening point was 120° C.

Example II

A flask equipped with a Dry Ice reflux condenser, a mercury-sealed stirrer and a dropping funnel was charged with 150 g. of freshly distilled dichlorostyrene and 500 cc. of MeCl. A solution of AlCl$_3$ in MeCl (0.40 g./100 cc.) was added to the well-stirred solution at a rate sufficient to maintain gentle refluxing at about −20° C., and a yellow colored reaction mixture was formed. After quenching in alcohol and drying at 120° C. an 85% yield of brittle, thermoplastic resin resulted which had a softening point of 70° C.

Example III

A solution of 25 g. of p-chlorostyrene and 25 g. of styrene in 250 cc. of MeCl was cooled to −100° C. in an ethylene jacketed reactor. When AlCl$_3$-MeCl catalyst solution was added to the feed a yellow-orange clear solution resulted. The temperature of polymerization was maintained at −100° C. by the vaporization of the liquid ethylene in the jacket. Upon quenching the reaction mixture in a large volume of i-C$_3$H$_7$OH a 94% yield of dry, hard, clear resin resulted. It had a softening point of 110° C. and was soluble in benzene and methyl ethyl ketone, softened in 54 naphtha and was insoluble in petroleum ether.

Example IV

A feed of 50 g. of styrene and 50 g. of dichlorostyrene dissolved in 400 cc. of MeCl was placed in a jacketed reactor maintained at −70° C. This temperature was reached by controlling the rate of circulation of liquid ethylene through a coil immersed in the jacket containing a low freezing liquid. A solution of AlCl$_3$ in MeCl (0.6 g./100 cc.) was added through a jet for 5 minutes at a rate of 36 cc./min. to the well-stirred feed. The yield of dry resin was 91 g. (91%). The chlorine content was 19.7% and the softening point 125° C.

Example V

A solution of 50 g. of isobutene, 25 g. of p-chlorostyrene and 25 g. of styrene in 500 cc. MeCl was cooled to −100° C. in an ethylene jacketed reactor. A solution of AlCl$_3$ in MeCl (0.50 g./100 cc.) was added through a jet at a rate of 36 cc./min. When a conversion of 90% was reached the reaction mixture was quenched in i-C$_3$H$_7$OH and the precipitated polymer dried on a rubber mill. The intrinsic viscosity of the tripolymer was 0.70 and it was capable of being drawn or calendered in the form of films, sheets, threads, and the like to form effective moisture barriers.

The outstanding differences between the various polymers described herein may be summarized as follows:

(1) Polyhalostyrenes are higher melting than polystyrenes of comparable molecular weight. The order is as follows: Polydichlorostyrene >poly-p-chlorostyrene>polystyrene.

(2) Copolymers of dichlorostyrene and styrene are higher melting than copolymers of p-chlorostyrene and styrene, which in turn are higher melting than polystyrene of comparable molecular weight.

(3) Poly-p-chlorostyrene and copolymers of p-chlorostyrene and styrene are more soluble in oxygenated solvents than polystyrene. Similarly, copolymers of dichlorostyrene and styrene are indicated to be even more soluble.

While this invention is concerned mainly with the formation of modified styrene resins constituted substantially or entirely of monomeric units having an aromatic nucleus, as in styrene and its derivatives, it is of interest to note that other resins deviating more or less in characteristics from polystyrene and halogenated polystyrenes are obtainable by interpolymerizing halogenated styrene monomers with polymerizable aliphatic monomers, e. g., an alkene such as isobutene, alkadienes such as butadiene, or isoprene, polyenes, and the like. As the proportion of the aliphatic monomer is increased, the resulting interpolymers tend to lose desired characteristics of surface hardness and resistance to solvent action by many ordinary liquids, such as paraffinic naphthas, lubricating oils, animal and vegetable oils, etc. If the aliphatic monomer has more unsaturation than an alkene, it has the tendency of giving the resulting interpolymer less chemical stability.

Investigations at first indicated that interpolymerization of a halogenated styrene with isobutene did not give a satisfactory tough resin but gave low yields of a soft polymer. Later it was found that a feed consisting of styrene, halogenated styrene, and about 50% or less of isobutene gave a good yield of satisfactory resin. It was indicated that the aliphatic monomer has a greater tendency to enter the polymer chain than either of the styrenes. Hence, it is found that with low temperature catalytic polymerization conditions favoring interpolymerization of a halogenated styrene with isobutene, and particularly by having the halogenated styrene with styrene predominate as reactants, satisfactory resins are obtained. Furthermore, better results were obtained by using para-chlorostyrene rather than dichlorostyrene as the halogenated styrene monomer.

To recapitulate, in accordance with the objects of the present invention, the desired and preferred resins are formed predominately of polymerized styrene units, some or all of which are halogenated, and some of which may be alkylated. This class of resins embraces the homopolymers of a halogenated styrene monomer additively combined as substantially a single reactant substance. It embraces copolymers formed by combination of a halogenated styrene monomer of one kind with another, or with the monomer of styrene, or with the monomer of an alkyl substituted styrene. It may also be considered to include interpolymers in which halogenated styrene units are combined with a minor amount of an aliphatic monomer that is capable of polymerizing under the conditions used, the aliphatic monomer being preferably isobutene.

For many molded articles a higher melting or more heat resistant thermoplastic is desired than polystyrene, which generally has a softening point no higher than about 100° C. Copolymerization of styrene with halostyrene offers a means of obtaining increased softening point.

The halogen-containing styrene resins combine a number of useful properties for many applications, e. g., insulating properties, good strength, machineability, and moldability. With adjustment of halogen content, they are made less flammable than polystyrene, more compatible with plasticizers, have less water absorption, and different degrees of oil resistance.

The solubility characteristics are varied with the halogen content of the resins. For example, poly-p-chlorostyrene is more readily dissolved in benzene and methyl ethyl ketone than is the copolymer of p-chlorostyrene with styrene, which is more readily soluble in these solvents than polystyrene. Polystyrene is more readily soluble in paraffinic naphtha hydrocarbons.

For the sake of brevity and simplicity the term styrene derivatives has been used to denote alkyl substituted styrene homologs, e. g., alpha methyl styrene, alpha methyl paramethyl styrene, paramethyl styrene, etc., and the term halogenated styrene derivatives has been used to denote styrene and its derivatives containing halogen substituents, such as p-chlorostyrene, p-bromostyrene, 2,4-dichlorostyrene, etc. The styrene derivatives which are of most interest on account of their reactivity, availability, and capability of forming the desired products may be characterized broadly as being phenylethenes, i. e., compounds containing a phenyl or aromatic nucleus linked to an ethenyl side chain. For example, styrene is properly termed phenylethene, and alpha-methyl parametyhyl styrene is a phenylethene, more specifically 1-methyl-p-methyl phenylethene. Similarly, p-chlorostyrene is p-chlorophenylethene.

The present invention is not to be restricted by the specific examples given for the purpose of illustration, for other modifications are intended to come within the spirit and scope of the invention as defined in the appended claims.

I claim:
1. A tripolymer of 50% by weight of isobutylene, 25% of p-chlorostyrene and 25% of styrene, said tripolymer having an intrinsic viscosity of 0.70.
2. Process of making tripolymer resins which comprises copolymerizing 50% by weight of isobutylene, 25% by weight of p-chlorostyrene and 25% of styrene in methyl chloride as solvent, at −100° C., using a solution of aluminum chloride in methyl chloride as catalyst, whereby a high molecular weight solid tripolymer is produced having an intrinsic viscosity of 0.70.

JOHN D. GARBER.

REFERENCES CITED

The following references are of record in the file of this patent:

UNITED STATES PATENTS

| Number | Name | Date |
|---|---|---|
| 1,890,772 | Dykstra | Dec. 13, 1932 |
| 2,066,330 | Carothers | Jan. 5, 1937 |
| 2,368,538 | Gleason et al. | Jan. 30, 1945 |
| 2,398,736 | Driesbach | Apr. 16, 1946 |
| 2,406,319 | Brooks et al. | Aug. 27, 1946 |

FOREIGN PATENTS

| Number | Country | Date |
|---|---|---|
| 513,521 | Great Britain | Oct. 16, 1939 |
| 564,829 | Great Britain | Oct. 16, 1944 |

OTHER REFERENCES

Michalek et al.: Chem. Eng. News, vol. 22, pages 1559–1563, September 25, 1944.

Marvel et al.: article in J. Am. Chem. Soc., vol. 65, pages 2054–2058, November 1943.